March 4, 1952  J. D. NELSON ET AL  2,588,151
APPARATUS FOR PRODUCING UNIFORM FOAM STRUCTURES
Filed Sept. 30, 1948
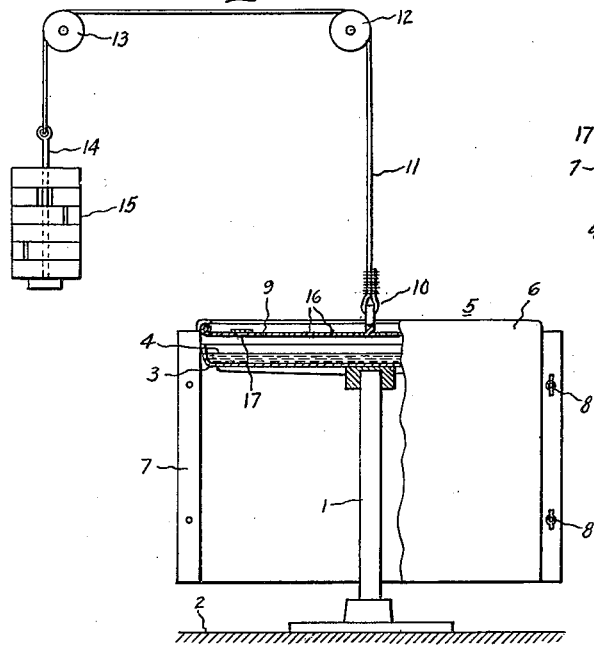
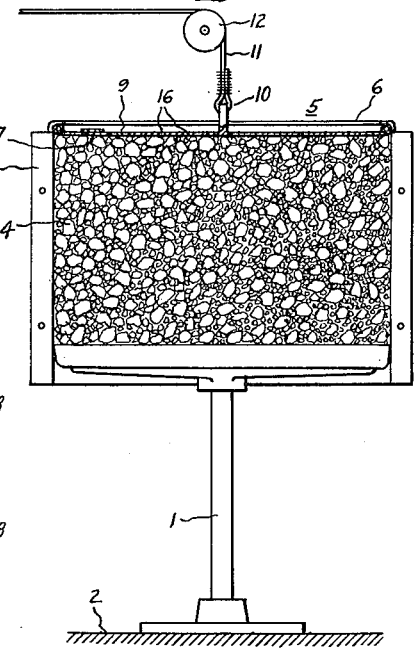
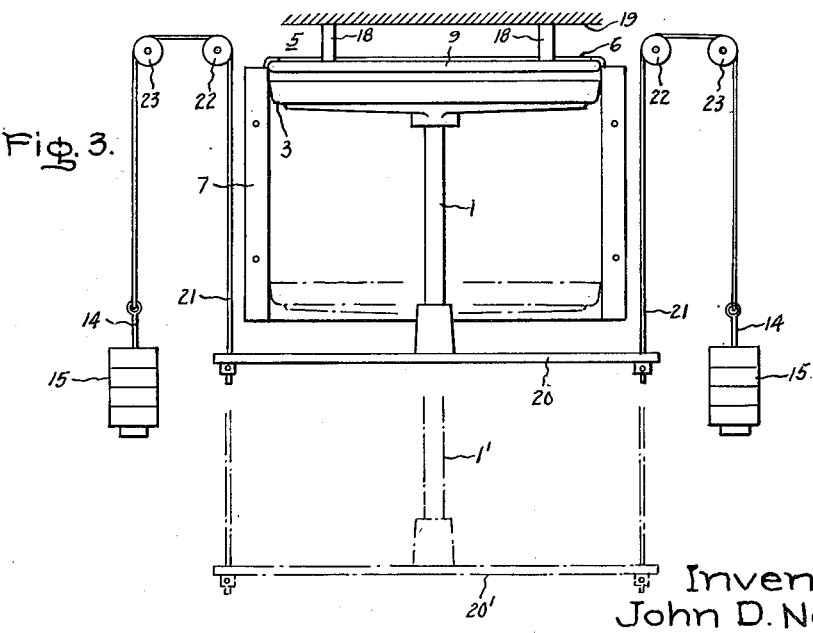
Inventors:
John D. Nelson,
James J. Pyle,
James W. Underwood,
by
Their Attorney.

Patented Mar. 4, 1952

2,588,151

UNITED STATES PATENT OFFICE 2,588,151

APPARATUS FOR PRODUCING UNIFORM FOAM STRUCTURES

John D. Nelson, James J. Pyle, and James W. Underwood, Pittsfield, Mass., assignors to General Electric Company, a corporation of New York Application September 30, 1948, Serial No. 51,904

3 Claims. (Cl. 18—39)

This invention relates to apparatus for the production of resinous parts. More particularly, it is concerned with apparatus for the production of foamed cellular molded parts.

The methods heretofore used in the production of foamed cellular molded parts included pouring the foam-producing material, such as a phenolic resinous mixture into a container having the shape of the final desired product and allowing the material to foam or expand out of the container. The product or part thus formed was usually found deficient in several important respects. Excessive sticking of the foam to the sides of the container as it expanded was experienced despite greasing to reduce friction, especially in the case of deep containers. Parts made in this manner also varied considerably in density from top to bottom, and variations from the desired cross section occurred due to nonuniform friction conditions. It was also noticed that the texture of parts produced by this method was usually poor due to the presence of pockets, voids, tears, etc. These defects became more serious and apparent as the size of the foamed cellular molded parts increased.

An object of this invention is to reduce the friction between an expanding cellular molded part and its forming container.

Another object is to improve the efficiency of the foaming operation, thereby securing a greater volume of foam per unit of volume of the original resinous mixture.

Another object is to produce foamed cellular molded parts of greater size than were heretofore obtainable.

A further object of the invention is to produce foamed cellular molded parts having a more uniform density and texture throughout.

Other objects will become evident and the invention will be better understood from a consideration of the following description and drawing in which Fig. 1 represents an apparatus partly in section for making foamed cellular parts; Fig. 2 is an illustration partly in section of the apparatus after a foamed cellular part has been molded therein, and Fig. 3 illustrates a modification partly in section of the apparatus shown in Fig. 1.

It has been found that large and uniform foamed cellular molded resinous parts may be produced by using a very simple apparatus. More particularly, it has been found that when the vessel or pan containing the reactant resinous mixture in one instance or the form confining the resin foam in another instance is approximately or exactly counterbalanced by suitable weights, the expanding resin carries along with it the containing form thereby reducing the friction and producing a superior foamed cellular product.

In Fig. 1, showing a typical apparatus for carrying out this invention, there is represented a support 1 fixed to a floor or other solid base 2, the support holding receptacle which may be in the form of a shallow vessel or pan 3 containing the reactant or foam-producing resinous mixture 4, the size and shape of the vessel together with the confining form determining the size, shape and cross-section of the finished product. Fitting about the periphery or rim of the vessel opening and spaced slightly therefrom is a confining and movable form 5. This bottomless form may be conveniently made of sheet metal stock in two flanged halves or sections 6 and 7 which may be easily secured together as at 8 by any suitable means. Contained within the upper part of form 5 and fixed thereto by any suitable means, is a perforated cover or plate 9 which rests on or slightly above vessel 3. The entire assembly of form 5 and cover 9 is fixed as shown at 10 to cable 11 which passes over pulleys 12 and 13 and terminates with carrying weights 15. Weights 15 may be so adjusted as to counterbalance the system to which they are connected. However, in some cases, the weights used may be purposely made less than, or in excess of that necessary to counterbalance the system so that the expansion of the resin may be controlled to the desired degree. (See examples.) The entire apparatus is constructed preferably of metal since such material can be cleaned more easily than wood, for example.

In operation with a reactant resinous mixture 4, such as that described in Nelson et al. Patent 2,446,429, August 3, 1948, and assigned to the same assignee as the present invention, undergoing the foam-producing reaction, the form 5 is moved upward by the pressure of the foam as the latter increases in volume. Since the form 5 moves weight holder 14 and the foam 4 expands upward at the same time there is little or no friction between the foam and any metal surface. This vessel, as well as the inner parts of form 5 and the underside of cover 9, may be lubricated. A lubricant such as petrolatum, not only reduces what little friction remains but also facilitates the cleaning of the form after use. The force or pressure required for causing form 5 to move upward is relatively small not only when the weight of form 5 and cover 9 is exactly counterbalanced by the weights 15, but also when the weights are purposely made either less than or in excess of the weight necessary to counterbalance the system as mentioned above. Although form 5 surrounds vessel 3 very closely, sufficient clearance is allowed so that the form can move freely in a vertical direction.

While the resinous mixture 4 may be poured into vessel 3 before the form 5 and plate or cover 9 are assembled, it is preferably introduced through a small closable hole such as 17 after the entire apparatus is assembled. Plate or cover 9 preferably is perforated with a number of small holes as shown at 16 which allow the ready escape of gas formed during the reaction. The remaining surface of the plate affords an adequate area against which the foam may act in forcing the plate and form upward from their position as shown in Fig. 1 to the position shown in Fig. 2.

While the particular form 5, as shown, is for use in the molding of slabs or blocks of foamed cellular material, it is to be understood that this example is to be taken as merely illustrative rather than limiting. For instance, cylinders and tubes of foamed cellular molded resin have been fabricated by varying the shape and size of the foam and vessel accordingly. It is also quite evident that products of any cross section may be made using appropriately shaped forms corresponding to the contour of the final product desired.

An alternative apparatus arrangement for use in the present invention is shown in Fig. 3, and it is altogether likely that still other arrangements using the concept embodied herein will occur to those skilled in the art. In the device illustrated in Fig. 3 the vessel 3 is movable and the form 5 and cover or plate 9 are immovable, the form 5 being fastened to cover or plate 9 which in turn is fixed as by struts 18 to a beam or other suitable support 19. Cover 9 is provided with the gas escape holes 16 and filling holes 17. In this modification vessel support 1 is fixed to platform 20 which is supported by two cables 21 passing over similar pulleys 22 and 23 and terminating in weight holders 14 having weights 15 placed thereupon which may or may not be adjusted exactly to counterbalance the weight of vessel 3, the resinous mixture, supporting platform 20 and vessel support 1. In this case, when a charge of a foam-producing resinous mixture is placed in vessel 3 and reacted, the force or pressure exerted by the expanding foam causes the support and vessel to move downward as the resinous mixture expands to the position shown by 1' and 20'. Here, again, the weights may either be in excess of or less than that required to counterbalance the system depending on the exact degree of control desired over the expanding resin.

The expanded resinous mixture or foam is allowed to solidify with the form in place, after which the sections 6 and 7 of form 5 are unclamped and removed. It is preferred, especially when the shape of the molded part is more complicated, that the form be lined with kraft or similar paper, the paper sticking to the finished part. The forms themselves may also be made of paper.

The density of the foam may be controlled by varying the relative weight of the form and plate system and counterbalance as shown in Fig. 1 or the resin-containing apparatus and counterweights illustrated in Fig. 2. Using the apparatus depicted in Fig. 1 with the form weighing 42¼ pounds and with a liquid resinous charge in the vessel equal to 5 grams per square inch of vessel bottom area the following results were obtained with various counterweights.

I

| | |
|---|---|
| Counterweight (balanced condition) | 42¼ pounds. |
| Foam slab height | 26 inches. |
| Foam texture | Excellent, uniform. |
| Foam density | 0.273 pound/cu. ft. |

II

| | |
|---|---|
| Counterweight (counterweight 2⅜ pounds heavier than form and plate) | 44⅝ pounds. |
| Foam slab height | 31½ inches. |
| Foam texture | Excellent, uniform. |
| Foam density | 0.263 pound/cu. ft. |

III

| | |
|---|---|
| Counterweight (counterweight 2⅜ pounds lighter than form and plate) | 39⅞ pounds. |
| Foam slab height | 24½ inches. |
| Foam texture | Excellent, uniform. |
| Foam density | 0.304 pound/cu. ft. |

IV

| | |
|---|---|
| Old method | Pouring into open container. |
| Liquid charge | 5 grams / square inch of area. |
| Foam slab height | 18 inches. |
| Foam texture | Irregular, holes, coarse. |
| Foam density | 0.281 pound/cu. ft. |

From the above it will be seen that in addition to producing foamed molded parts of excellent and uniform texture, it is possible by the method of the present invention to vary the density of the final product to meet varying needs as well as to obtain resultant foams of varying size.

What we claim as new and desire to secure by Letters Patent of the United States is:

1. Apparatus for forming cellular molded phenolic parts comprising an open-topped receptacle to receive a potentially self-expansible phenolic resin, a perforated form adapted to enclose said receptacle, said form and said receptacle being movable relative to each other in a substantially vertical direction upon expansion of said phenolic resin, and counterbalancing means connected to one of said forms and receptacle, said counterbalancing means being directly responsive to the expansion of the self-expansible resin for controlling the relative movement of said form and receptacle.

2. Apparatus for forming cellular molded phenolic parts comprising a confining perforated form open at one end and corresponding substantially to the cross-section of the finished product, a receptacle disposed within the open end of said confining form and adapted to receive a potentially self-expansible phenolic resin, said form and said receptacle being movable relative to each other in a substantially vertical direction, and counterbalancing means connected to said form and directly responsive to the expansion of the self-expansible resin for controlling the aforesaid vertical movement.

3. Apparatus for forming cellular molded phenolic parts comprising a confining form having vertical side walls, a perforated cover plate and an open lower end, and a receptacle mounted for telescoping movement within said form, and counterbalancing means connected to said receptacle and directly responsive to the expansion of the self-expansible resin for controlling the substantially relative vertical movement of said receptacle with respect to the form and cover plate.

JOHN D. NELSON.
    JAMES J. PYLE.
    JAMES W. UNDERWOOD.

REFERENCES CITED

The following references are of record in the file of this patent:

UNITED STATES PATENTS

| Number | Name | Date |
|---|---|---|
| 873,559 | Koontz | Dec. 10, 1907 |
| 1,515,475 | Goodwin | Nov. 11, 1924 |
| 1,658,567 | MacDonald | Feb. 7, 1928 |
| 1,858,956 | Hepperle | May 17, 1932 |
| 2,394,122 | Urmston | Feb. 5, 1946 |

FOREIGN PATENTS

| Number | Country | Date |
|---|---|---|
| 313,700 | Great Britain | June 20, 1929 |
| 389,315 | Germany | Feb. 5, 1924 |